US009053552B2

(12) United States Patent
Sasaki et al.

(10) Patent No.: US 9,053,552 B2
(45) Date of Patent: Jun. 9, 2015

(54) IMAGE PROCESSING APPARATUS, IMAGE PROCESSING METHOD AND NON-TRANSITORY COMPUTER READABLE MEDIUM

(71) Applicant: FUJI XEROX CO., LTD., Minato-ku, Tokyo (JP)

(72) Inventors: Makoto Sasaki, Kanagawa (JP); Masaomi Sakamoto, Yokohama (JP); Masaru Okutsu, Yokohama (JP); Daigo Hama, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 83 days.

(21) Appl. No.: 13/891,912

(22) Filed: May 10, 2013

(65) Prior Publication Data

US 2014/0093168 A1    Apr. 3, 2014

(30) Foreign Application Priority Data

Oct. 2, 2012    (JP) .................................. 2012-220105

(51) Int. Cl.
*G06K 9/00* (2006.01)
*G06T 5/00* (2006.01)
*G06T 5/40* (2006.01)
*H04N 5/205* (2006.01)

(52) U.S. Cl.
CPC . *G06T 5/009* (2013.01); *G06T 5/40* (2013.01); *G06T 2207/10024* (2013.01); *H04N 5/205* (2013.01)

(58) Field of Classification Search
CPC ..... H04N 1/60; H04N 1/6005; H04N 1/6027; H04N 5/57; H04N 9/646; G06T 2207/10024; G06T 2207/20192; G06T 5/40; G06T 7/408

USPC .................... 382/162, 167; 345/604; 358/518
See application file for complete search history.

(56) References Cited

U.S. PATENT DOCUMENTS

| | | | | |
|---|---|---|---|---|
| 5,459,589 | A * | 10/1995 | Ohnishi et al. | 358/518 |
| 7,456,873 | B2 * | 11/2008 | Kohashi et al. | 348/235 |
| 7,970,236 | B2 * | 6/2011 | Nakamura | 382/276 |
| 8,009,201 | B2 * | 8/2011 | Takayama | 348/222.1 |
| 8,165,390 | B2 * | 4/2012 | Kunugi et al. | 382/162 |
| 8,280,162 | B2 * | 10/2012 | Tsukioka | 382/167 |
| 8,797,427 | B2 * | 8/2014 | Tsutsumi et al. | 348/242 |
| 2008/0143881 | A1 | 6/2008 | Tsukioka | |
| 2008/0240556 | A1 | 10/2008 | Tsuruoka | |
| 2010/0231759 | A1 | 9/2010 | Tsutsumi et al. | |

FOREIGN PATENT DOCUMENTS

| | | |
|---|---|---|
| JP | 10-23279 A | 1/1998 |
| JP | 2007-66138 A | 3/2007 |

(Continued)

*Primary Examiner* — Kanjibhai Patel
(74) *Attorney, Agent, or Firm* — Sughrue Mion, PLLC

(57) ABSTRACT

An image processing apparatus includes: an adjusting unit that adjusts a color characteristic in relation to a color image; a conversion unit that converts the color image of which color characteristic is adjusted with the adjusting unit into a luminance-chromaticity image; a band image generating unit that generates a band image that represents a predetermined band from a luminance image of the luminance-chromaticity image; an emphasizing unit that obtains a band emphasized image that emphasizes a band using the luminance image and the band image; and a setting unit that sets an emphasized degree of the band performed by using the emphasizing unit and an adjusted degree of the color characteristic performed by using the adjusting unit.

9 Claims, 8 Drawing Sheets

(56) References Cited

FOREIGN PATENT DOCUMENTS

| | | | |
|---|---|---|---|
| JP | 2008-72252 A | 3/2008 |
| JP | 2008-219198 A | 9/2008 |
| JP | 2010-219797 A | 9/2010 |
| JP | 2010-278516 A | 12/2010 |

* cited by examiner

IMAGE PROCESSING APPARATUS, IMAGE PROCESSING METHOD AND NON-TRANSITORY COMPUTER READABLE MEDIUM

CROSS-REFERENCE TO RELATED APPLICATIONS

This application is based on and claims priority under 35 U.S.C. 119 from Japanese Patent Application No. 2012-220105 filed on Oct. 2, 2012.

BACKGROUND

1. Technical Field

The present invention relates to an image processing apparatus, an image processing method and a non-transitory computer readable medium.

2. Related Art

The correction of a digital image is generally performed using information such as, for example, luminance, chromaticity and frequency. The luminance emphasizes a pattern by brightening or darkening an image as a whole as compared to original brightness thereof or providing an intensity difference (contrast) to the image. In addition, with regard to the chromaticity, the image with a clear color is reproduced by chroma emphasis or correction of over-dyeing that shifts the color (color balance correction).

In some cases, the luminance and the chroma both may be adjusted. FIG. 10 is an explanatory view illustrating an example of the comparative correction processing. In FIG. 10, reference numeral 21 indicates a color conversion unit, reference numeral 22 indicates a luminance adjusting unit, reference numeral 23 indicates a chroma adjusting unit, and reference numeral 24 indicates a color conversion unit. A color image to be corrected which is captured by an imaging device such as, for example, a digital camera is represented by an RGB signal (primary color signal) such as, for example, an sRGB, herein. First, the RGB signal is converted into a luminance signal Y and a chromaticity signal CbCr in the color conversion unit 21. Next, the luminance signal is adjusted in the luminance adjusting unit 22 to be a luminance signal Y'. The adjustment of the luminance emphasizes the outline of, for example, a subject by a correction based on a tone curve or a correction of luminance frequency (band) information with a luminance image, thereby reproducing the detailed part that represents the pattern. Further, the chromaticity signal CbCr is subjected to chroma adjustment in the chroma adjusting unit 23 to be a chromaticity signal Cb'Cr'. The luminance signal Y' adjusted in the luminance adjusting unit 22 and the chromaticity signal Cb'Cr' adjusted in the chroma adjusting unit 23 are returned into an RGB signal R'G'B' in the color conversion unit 24. Such a processing is performed for every pixel of the given color image to obtained a color image after adjustment.

SUMMARY

According to an aspect of the invention, an image processing apparatus includes: an adjusting unit that adjusts a color characteristic in relation to a color image; a conversion unit that converts the color image of which color characteristic is adjusted with the adjusting unit into a luminance-chromaticity image; a band image generating unit that generates a band image that represents a predetermined band from a luminance image of the luminance-chromaticity image; an emphasizing unit that obtains a band emphasized image that emphasizes a band using the luminance image and the band image; and a setting unit that sets an emphasized degree of the band performed by using the emphasizing unit and an adjusted degree of the color characteristic performed by using the adjusting unit.

BRIEF DESCRIPTION OF THE DRAWINGS

Exemplary embodiment(s) of the present invention will be described in detail based on the following figures, wherein.

DETAILED DESCRIPTION

Figure 1:
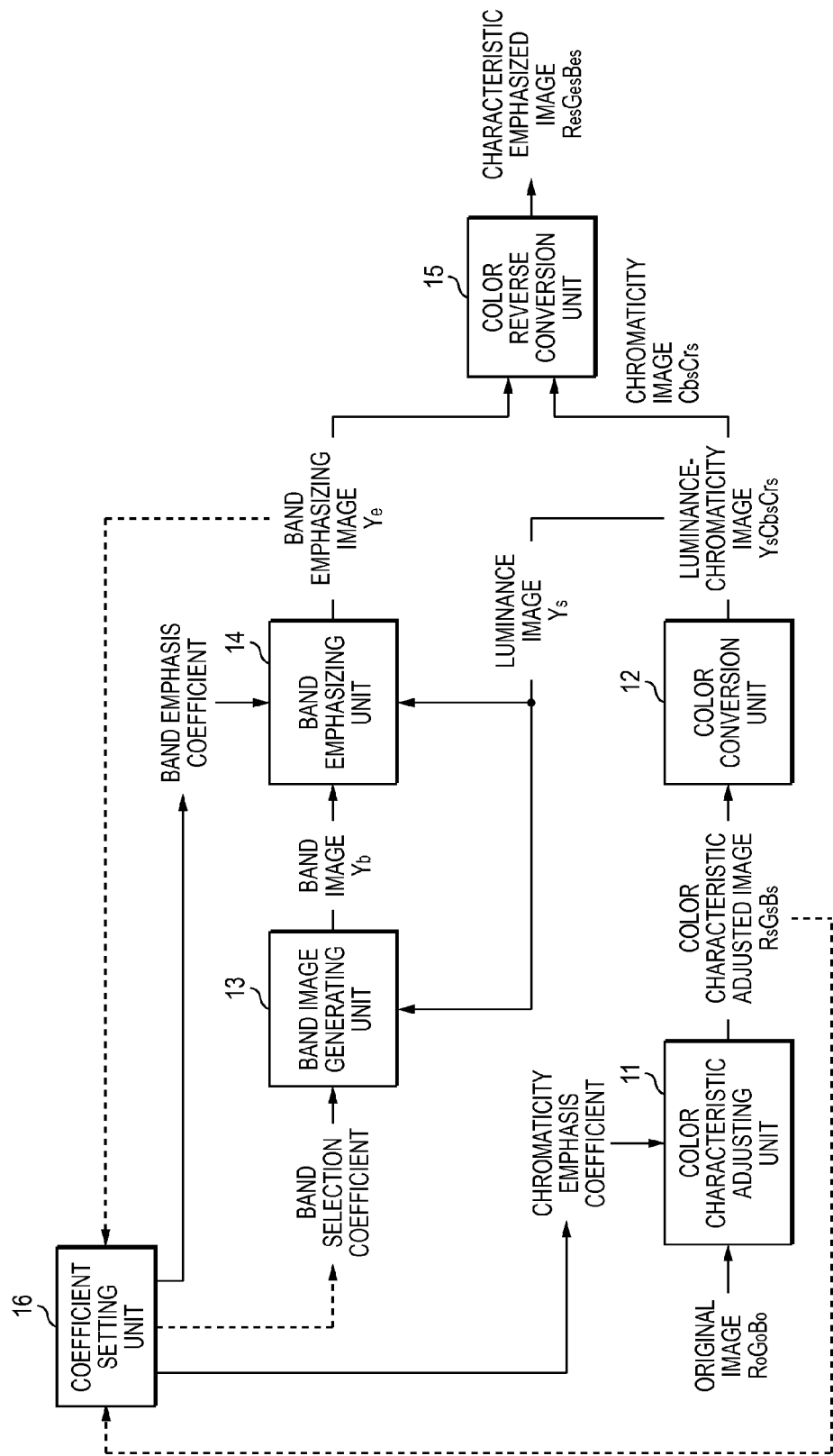
FIG. 1 is a block diagram illustrating an exemplary embodiment of the present invention.

FIG. 1 is a block diagram illustrating an exemplary embodiment of the present invention. In FIG. 1, reference numeral 11 indicates a color characteristic adjusting unit, reference numeral 12 indicates a color conversion unit, reference numeral 13 indicates a band image generating unit, reference numeral 14 indicates a band emphasizing unit, reference numeral 15 indicates a color reverse conversion unit, and reference numeral 16 indicates a coefficient setting unit. In the embodiment, color spaces of a given original image and a characteristic emphasized image after processing are an RGB color space. However, the present invention is not limited thereto. An image in other color space may be used, and the color space of the original image may be different from the color space of the characteristic emphasized image. Further, though the luminance-chromaticity color space that is used during the processing is an YCbCr color space, any color space may be used as long as the color space is represented using luminance as a one axis. For example, the color space may includes a HSV color space or a LAB color space in which the luminance is L* and the chromaticity is a*b*.

Figure 10:
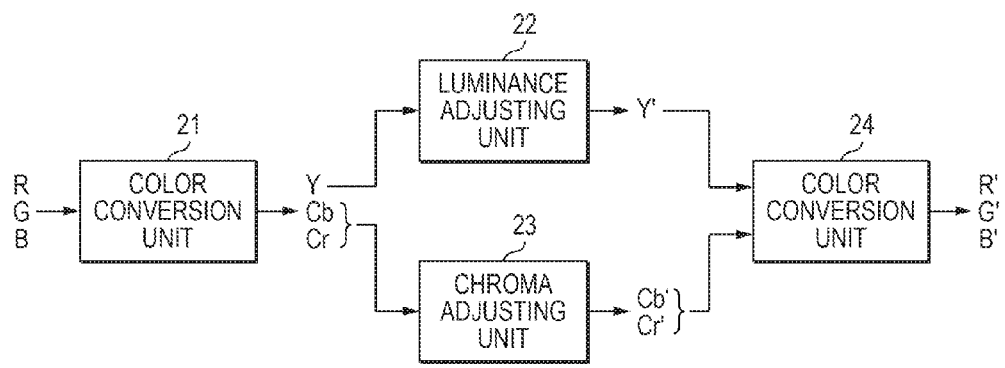
FIG. 10 is an explanatory view illustrating an example of the conventional correction processing.

The color characteristic adjusting unit 11 adjusts the color characteristic in relation to the given color original image according to the chromaticity dynamics coefficient set by the coefficient setting unit 16. The color characteristic adjustment is performed using a signal of the color space of the original image (here, an RGB signal). The conventional color characteristic adjustment as illustrated in FIG. 10 is performed using a chromaticity such as a CbCr signal. However, when the adjustment is performed using a primary color signal such as an RGB signal, a processing that provides a natural dynamics in relation to, for example, spectral sensitivity of an imaging device.

One method that adjusts the chromaticity dynamics using the color characteristic may be a technology in which dynamics are provided to a difference between max(RoGoBo) and min(RoGoBo), where "RoGoBo" indicates pixels of the original image, "max(RoGoBo)" indicates the largest value of Ro, Go, Bo, and "min(RoGoBo)" indicates the smallest value of Ro, Go, Bo. For example, the chroma dynamics may be provided as follows:

$Rs=\alpha d(Ro-\min(RoGoBo))+\min(RoGoBo)$ $Gs=\alpha d(Go-\min(RoGoBo))+\min(RoGoBo)$ $Bs=\alpha d(Bo-\min(RoGoBo))+\min(RoGoBo)$ [Equation 1]

Here, "RsGsBs" indicates an RGB signal of the pixel value after the chroma dynamics are provided, and hereinafter, will be referred to as a color characteristic adjusting pixel value. Further, a coefficient that represents the adjusted degree of the color characteristic is a chromaticity dynamics coefficient, and is set by the coefficient setting unit 16. In Equation 1, "αd" indicates the dynamics degree of the chroma, and becomes a chromaticity dynamics coefficient. When αd=1, the dynamics are not provided.

Figure 2:
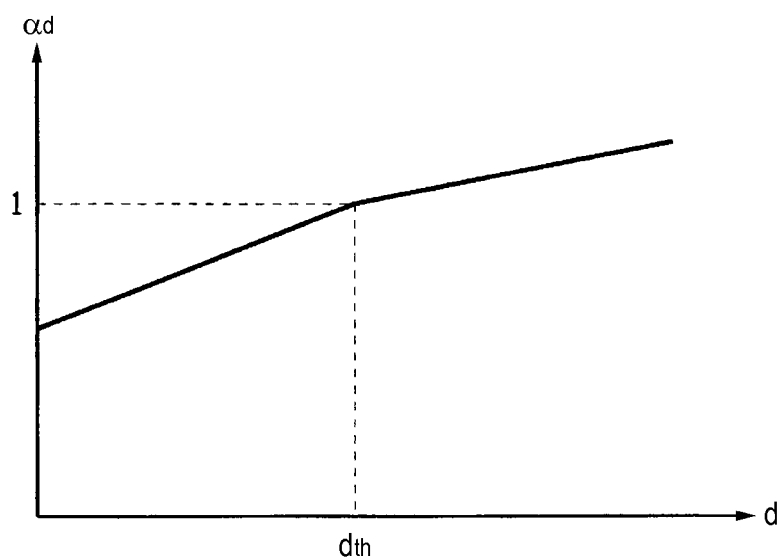
FIG. 2 is an explanatory view illustrating an example of a chromaticity dynamics coefficient.

FIG. 2 is an explanatory view illustrating an example of a chromaticity dynamics coefficient. An example of the chromaticity dynamics coefficient αd may be a value obtained by a broken line approximation function as illustrated in FIG. 2. "d" of the axis of abscissa is $d=\max(RoGoBo)-\min(RoGoBo)$ and is a difference between the maximum primary color component and the minimum primary color component. For every pixel, a difference d between the maximum primary color component and the minimum primary color component is calculated, and then, a coefficient αd may be calculated in such a manner that αd≥1 when d≥dth and αd<1 when d<dth. "dth" may use a predetermined value, and may use a value obtained by calculating d for each pixel of the original image and calculating an average from those. Alternatively, "dth" may be determined from the deviation of the distribution while referring to the histogram of "d".

The function as illustrated in FIG. 2 is an example. The slope or shape is not limited to the example, and any one may be used as long as the chroma dynamics are capable of being provided by Equation 1. A method is not matter as long as the chroma dynamics are provided at each pixel by increasing or decreasing the difference of the primary color components. A coefficient representing the adjusted degree in the use method is a chromaticity dynamics coefficient.

The color conversion unit 12 performs a conversion processing of a color space that converts a color characteristic adjusted image into a luminance-chromaticity image. The color characteristic adjusted image is a color image of which color characteristic is adjusted in the color characteristic adjusting unit 11. The color space conversion processing also has a function that generates a luminance image to be used in the band image generating unit 13 as described below, and a function that matches the color space between a band emphasized image obtained from the band emphasizing unit 14 as described below and the color characteristic adjusted image obtained from the color characteristic adjusting unit 11. The pixel value RsGsBs of the color characteristic adjusted image obtained by adjusting the chromaticity dynamics in the color characteristic adjusting unit 11 has not a luminance component as an element. Therefore, the image is converted into a color space having a luminance component, e.g., a YCbCr color space in here, and thus, an image represented by Y component may be a luminance image. In addition, it becomes a color signal in a color space common with the luminance signal Ye of the band emphasized image obtained in the emphasis processing of the band emphasizing unit 14 as described below, by the conversion of the color space. Meanwhile, it may be a conversion into a different color space such as, for example, a HSV color space or a LAB color space as a color space having a luminance component, and the luminance image may be obtained using a V component when it is the HSV color space or a L* component when it is the LAB color space.

The RGB signal is converted into a YCbCr signal by the following Equation 2.

$$\begin{pmatrix} Y \\ Cb \\ Cr \end{pmatrix} = \begin{pmatrix} m_{11} & m_{12} & m_{13} \\ m_{21} & m_{22} & m_{23} \\ m_{31} & m_{32} & m_{33} \end{pmatrix} \begin{pmatrix} R \\ G \\ B \end{pmatrix}$$ [Equation 2]

Coefficients $m_{11}, \ldots, m_{33}$ are known values, the processing is performed by a linear conversion. The luminance-chromaticity image YsCbsCrs is obtained by converting each pixel of the color characteristic adjusted image with Equation 2. The image represented by the Y component, which is a luminance component, among the luminance-chromaticity image YsCbsCrs is transferred to the band image generating unit 13 and band emphasizing unit 14 as a luminance image. The CbCr component, which is a chromaticity component, among the luminance-chromaticity image YsCbsCrs is transferred to the color reverse conversion unit 15.

The band image generating unit 13 receives an image represented Y component (which is a luminance component) among the luminance-chromaticity image YsCbsCrs converted in the color conversion unit 12 as a luminance image, and generates a band image that represents a predetermined band from the luminance image. For example, an image of which frequency is lower than the luminance image may be generated, or an image of an intermediate frequency band except the low frequency component and the high frequency component of the luminance image may be generated.

For example, in a case where an image of low frequency as compared to the luminance image is generated, a method using e.g., a filtering processing, a moving average, and a fast fourier transform (FFT) may be used. When the filtering processing (a convolution and a product-sum operation) is used, a two-dimensional Gauss filter as represented in Equation 3 may be used.

$$G(x, y) = \frac{1}{2\pi\sigma^2} \exp\left(-\frac{x^2 + y^2}{2\sigma^2}\right)$$ [Equation 3]

Since the image is two-dimensional, the area of the two-dimensional Gauss filter is represented by (x,y). "σ" is a coefficient that determines the degree of the low frequency, and the image is blurred as the σ is increased. As the blurring of the image is increased, the band of the low frequency side is emphasized in the band emphasizing unit 14 as described below (the emphasis of the outline or the substantial shape).

As the blurring is decreased, the band of the high frequency side is emphasized (the emphasis of the edge or fabric sense).

Another method that obtains a low frequency image may include an enlargement/reduction of an image. For example, the method may be performed by reducing a luminance image once to lower the information amount thereof, and enlarging the reduced image into a size of the original luminance image. In the method, the blur degree that matches the σ of Equation 3 becomes a reduction rate of the image.

Figure 3:
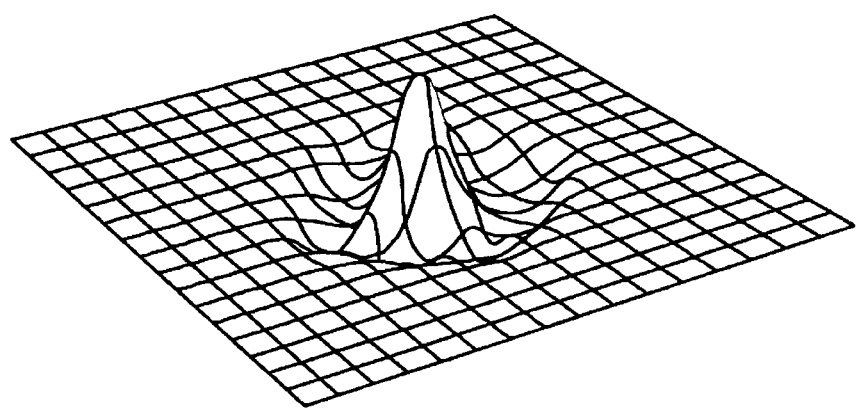
FIG. 3 is an explanatory view illustrating an example of a DOG function.

As described above, in addition to using a blur image as for a band image, an image (a sub band image) of which certain band is extracted by, for example, an intermediate frequency filter or a difference of two Gaussian (DOG) filter may be generated to be used as for a band image. FIG. 3 is an explanatory view illustrating an example of the DOG function. The DOG function is represented by following Equation 4.

$$G_{DOG}(x, y) = \frac{1}{2\pi\sigma_e^2} e^{-\frac{x^2+y^2}{2\sigma_e^2}} - A \frac{1}{2\pi\sigma_i^2} e^{-\frac{x^2+y^2}{2\sigma_i^2}}$$ [Equation 4]

The DOG function is known as for a mathematical model of a visual characteristic within a brain of a human. When the coefficients σe, σi, A are changed, a frequency band or the reaction intensity in relation to the frequency band is controlled. As the σe is decreased, the reaction for the high frequency is increased, and the σi is set to a value larger than the σe. The A controls the relative intensities of the plus gauss and the minus gauss. As the A approaches 0, the DOG function approaches a "blur" filter. An example of the DOG function is represented in FIG. 3. When an image is filtered using the function of Equation 4 as a filter, a sub band image according to the preset coefficients is obtained as for the band image.

Surely, the method that obtains an image of predetermined band is not limited to these methods, various methods may be used. Anyway, the method is not limited as long as an image that represents the predetermined band is generated. The generated image may be used as for the band image.

The setting of the band is performed by a band selection coefficient. The band selection coefficient is, for example, the σ of Equation 3 in a case of the two dimensional Gauss filter, the reduction rate in a case of the enlargement/reduction, and σe, σi, A of Equation 4 in a case where the DOG function is used. In other methods, a coefficient that represents a band in a band image becomes a band selection coefficient. The band selection coefficient may be fixed to a value, or may be configured to be set by the coefficient setting unit 16.

The band emphasizing unit 14 obtains a band emphasized image that emphasizes a band using the luminance image and the band image based on the band emphasis coefficient that represents the emphasized degree of the band and set in the coefficient setting unit 16. Since the band image generating unit 13 generates a band image that represents a predetermined band, the band is emphasized.

When the band image generating unit 13 generates a blurred image as for the band image, as the blur is increased, the low frequency image may be obtained, and the band at the low frequency side is emphasized by the band emphasizing unit 14. As a concrete example, it is suitable when the outline of an object or the shape thereof is emphasized. As the blur is decreased in the band image generating unit 13, an image in which the high frequency remains may be obtained, and the band at the high frequency side is also emphasized by the band emphasizing unit 14. As a concrete example, it is suitable when intending to increase the fabric sense such as fur.

As an example of an emphasis processing in the band emphasizing unit 14 in this case, a pixel value of the luminance image is set to Yo, a pixel value of the band image is made to Yb, and the difference between the pixel value of the luminance image Yo and the pixel value of the band image Yb may be emphasized to calculate a pixel value Ye after emphasis. For example, the pixel value Ye may be calculated by:

$Ye = \alpha y (Yo - Yb) + Yo$ [Equation 5]

The pixel value after emphasis Ye is referred to as a band emphasis signal. Further, as described above, a coefficient that represents an emphasized degree is a band emphasis coefficient, and the αy is the band emphasis coefficient in the emphasis processing by Equation 5. The band emphasis coefficient may be set based on the image. As the band emphasis coefficient is increased, the emphasized degree is increased.

Figure 4:
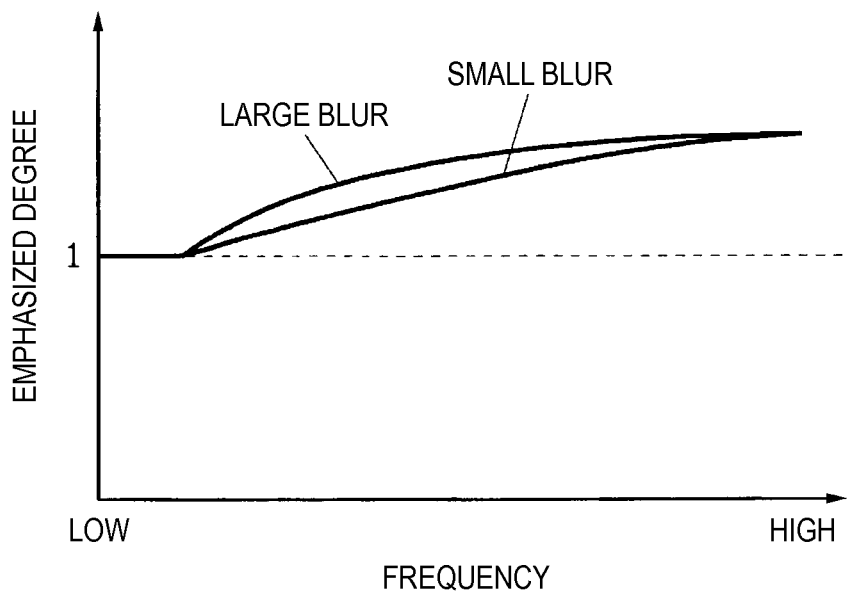
FIG. 4 is an explanatory view illustrating an example for a frequency and an emphasized degree in a case where a blur image is used as for a band image.

FIG. 4 is an explanatory view illustrating an example for a frequency and an emphasized degree in a case where a blur image is used as for a band image. In a case where a blur image is used as for a band image, as illustrated in FIG. 4, the high frequency band is emphasized by being slightly blurred in the band image generating unit 13 and being emphasized in the band emphasizing unit 14, and the low frequency is first emphasized by being largely blurred in the band image generating unit 13 and being emphasized in the band emphasizing unit 14 as compared to the case where the blur is small. The emphasized degree is changed based on the band emphasis coefficient αy.

In a case where a band image is generated by the DOG filter using Equation 4 in the band image generating unit 13, a calculation may be performed by using the following Equation 6 instead of Equation 5 to perform the band emphasis.

$Ye = \alpha y Yb + Yo$ [Equation 6]

Since the filter characteristic of Equation 4 becomes an equation that means the difference of the band at first, the emphasis result may be obtained by Equation 6. Any method may be used as long as the calculation method is based upon Equation 6. Meanwhile, the band emphasis coefficient in that case is also αy.

Figure 5:
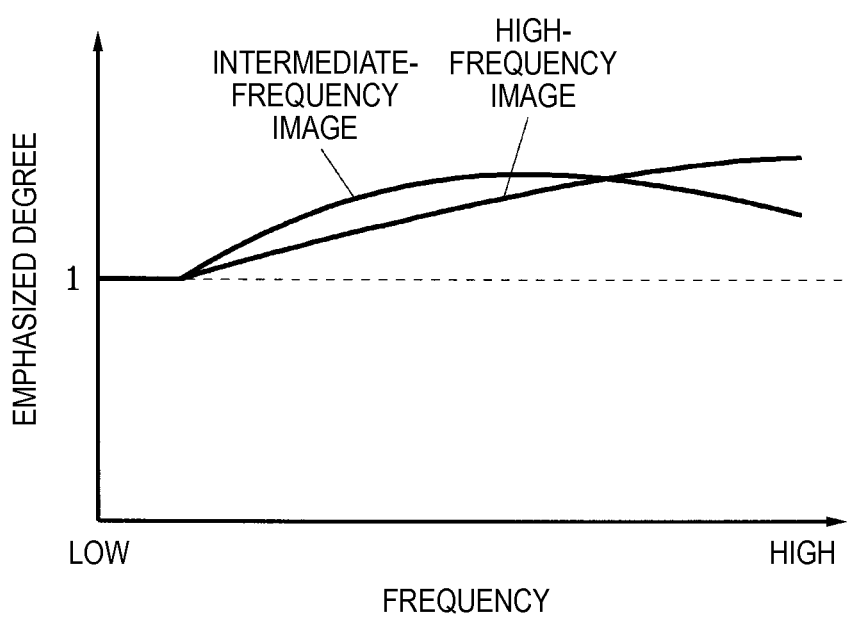
FIG. 5 is an explanatory view illustrating an example for a frequency and an emphasized degree in a case where an image obtained using a DOG filter is used as for a band image.

FIG. 5 is an explanatory view illustrating an example for a frequency and an emphasized degree in a case where an image obtained using a DOG filter is used as for a band image. In the filtering by Equation 4, a band is detected as a pinpoint. FIG. 5 illustrates the relationship between a frequency and an emphasized degree in relation to a case where a sub band image of high frequency is generated using Equation 4 and is emphasized using Equation 6 and a case where a sub band image of intermediate frequency is generated using Equation 4 and is emphasized using Equation 4. As compared to the case where a blur image is used as illustrated in FIG. 4, when the sub band image of intermediate frequency is generated and emphasized, the emphasis of the low frequency and the high frequency may be suppressed to obtain a band emphasis signal that emphasizes the intermediate frequency.

Sure, the emphasis processing may be performed by a method other than Equation 5 when the blur image is used and by a method other than Equation 6 when the DOG filter is used. Further, when a band image is generated by other method, a corresponding emphasis processing may be performed. In addition, with regard to the band emphasis coefficient, a coefficient that represents the emphasized degree at each method may be used as the band emphasis coefficient.

The color reverse conversion unit 15 combines the band emphasized image emphasized in the band emphasizing unit 14 and the chromaticity component image of the luminance-chromaticity image converted in the color conversion unit 12 to reversely convert the image into an image in a color space of color image. In other words, the luminance component of the luminance-chromaticity image converted in the color conversion unit 12 is replaced with a pixel value of the band emphasized image consist of the luminance component. Since an image is converted into a luminance-chromaticity color space in the color conversion unit 12 and the color space is not changed in the band image generating unit 13 and the band emphasizing unit 14, which becomes a component combination in the common color space. Therefore, it doesn't matter that the value of the luminance component is changed. Meanwhile, when a luminance-chromaticity image is needed as for a characteristic emphasized image, the band emphasized image and the chromaticity component of the luminance-chromaticity image may be combined and then the image may be outputted without the conversion of the color space.

The reverse transformation from YCbCr space into RGB space may be performed using a reverse matrix of the transformation matrix of Equation 2 as follows.

$$\begin{pmatrix} R \\ G \\ B \end{pmatrix} = \begin{pmatrix} m_{11} & m_{12} & m_{13} \\ m_{21} & m_{22} & m_{23} \\ m_{31} & m_{32} & m_{33} \end{pmatrix}^{-1} \begin{pmatrix} Y \\ Cb \\ Cr \end{pmatrix}$$ [Equation 7]

In this example, YeCbsCrs in which the band emphasis signal Ye and the chromaticity signal CbsCrs of the luminance-chromaticity signal YsCbsCrs are combined may be converted into a signal of the RGB color space. The converted signal is referred to as "ResGesBes". When calculating ResGesBes for every pixel, a characteristic emphasized image may be obtained as for the output.

The coefficients of the reverse matrix of Equation 7 have been already known. When the result is $$\begin{pmatrix} m_{11} & m_{12} & m_{13} \\ m_{21} & m_{22} & m_{23} \\ m_{31} & m_{32} & m_{33} \end{pmatrix}^{-1} = \begin{pmatrix} n_{11} & n_{12} & n_{13} \\ n_{21} & n_{22} & n_{23} \\ n_{31} & n_{32} & n_{33} \end{pmatrix}$$

since $m_{11}, \ldots, m_{33}$ are already known and $n_{11}, \ldots, n_{33}$ are also obtained by calculation, the relationship between the YeCbsCrs and the ResGesBes becomes as follows.

$Res = n_{11}Ye + n_{12}Cbs + n_{13}Crs$ $Ges = n_{21}Ye + n_{22}Cbs + n_{23}Crs$ $Bes = n_{31}Ye + n_{32}Cbs + n_{33}Crs$ [Equation 8]

An image of which pixel signal is ResGesBes obtained from Equation 8 is a characteristic emphasized image in which the band emphasis and the color characteristic adjustment are performed. The characteristic emphasized image is outputted as for the processing result.

The coefficient setting unit 16 sets a chromaticity dynamics coefficient that represents the adjusted degree of the color characteristic performed in the color characteristic adjusting unit 11 and a band emphasis coefficient that represents the emphasized degree of the band performed in the band emphasizing unit 14. Alternatively, the coefficient setting unit 16 may set a band selection coefficient that represents a band when the band image generating unit 13 generates a band image. These setting may be set based on, for example, the color scenes of the original image. The setting for each coefficient may be selected based on instructions from outside after some groups for each coefficient of which representation intentions are different are prepared in advance, in addition to being performed in advance. Alternatively, each coefficient may be set by the analysis of the given color image or may be set optionally. When a natural image is analyzed using a known image analysis method, similar designs may be obtained with different analysis results. Therefore, a processing based on the image may be performed by setting each coefficient without being seized with similarity.

Further, the chromaticity dynamics coefficient that represents the adjusted degree of the color characteristic performed in the color characteristic adjusting unit 11 and the band emphasis coefficient that represents the emphasized degree of the band performed in the band emphasizing unit 14 may be set so that the pixel value of the outputted characteristic emphasized image falls within the color gamut in response to a case where a problem occurs which is out of color gamut when the band emphasis and the color characteristic adjustment as described above. At that case, each coefficient may be set using, for example, a color characteristic adjusting pixel value undergone a color characteristic adjustment in the color characteristic adjusting unit 11 and a band emphasis signal undergone a band emphasis in the band emphasizing unit 14.

A case where each coefficient is set so that the pixel value of the characteristic emphasized image becomes within the color gamut will be further described. The color characteristic adjusting pixel value RsGsBs undergone the color characteristic adjustment in the color characteristic adjusting unit 11 and the luminance-chromaticity signal YsCbsCrs where the color characteristic adjusting pixel value RsGsBs is color converted in the color conversion unit 12 are in the mutual corresponding relation. However, since the YeCbsCrs signal where the band emphasis signal Ye and the chromaticity signal CbsCrs of the luminance-chromaticity signal are combined is different from the luminance-chromaticity signal YsCbsCrs in luminance, the pixel value of the characteristic emphasized image ResGesBes converted in the color reverse conversion unit 15 may be out of the color gamut. Therefore, the coefficient setting unit 16 further controls the band emphasis coefficient and the chromaticity dynamics coefficient, so that the pixel value of the characteristic emphasized image becomes within the color gamut.

The color characteristic adjusting pixel value RsGsBs undergone the color characteristic adjustment in the color characteristic adjusting unit 11 and the luminance-chromaticity signal YsCbsCrs where the color characteristic adjusting pixel value RsGsBs is color converted in the color conversion unit 12 establish the following Equation 9 from Equation 2.

$$\begin{pmatrix} Y_s \\ Cb_s \\ Cr_s \end{pmatrix} = \begin{pmatrix} m_{11} & m_{12} & m_{13} \\ m_{21} & m_{22} & m_{23} \\ m_{31} & m_{32} & m_{33} \end{pmatrix} \begin{pmatrix} R_s \\ G_s \\ B_s \end{pmatrix}$$ [Equation 9]

When the luminance signal Ys of the luminance-chromaticity signal is converted into the band emphasis signal Ye, the pixel value of the characteristic emphasized image ResGesBes is calculated from Equation 8. As any value of the calculated Res, Ges and Bes is within in a predetermined range, which is within the color gamut, and each coefficient may be as it is.

However, with regard to one or more of Res, Ges, Bes, a value out of the predetermined range may be calculated. For example, when a value of any of Res, Ges, Bes ranges in zero (0) or more and 255 or less, a value less than zero (0) or a value more than 255 may be obtained. Surely, the predetermined range is not limited to the above example, and may be set in various ranges such as zero (0) or more and 1 or less. In any set of the ranges, a value out of the range may be calculated. When a value out of the range, the pixel value ResGesBes of the characteristic emphasized image becomes out of the color gamut.

When the pixel value ResGesBes of the calculated characteristic emphasized image is out of the color gamut, Equation 8 is:

$$Res = n_{11} Ye \cdot wy + (n_{12} Cbs + n_{13} Crs) \cdot wd$$

$$Ges = n_{21} Ye \cdot wy + (n_{22} Cbs + n_{23} Crs) \cdot wd$$

$$Bes = n_{31} Ye \cdot wy + (n_{32} Cbs + n_{33} Crs) \cdot wd \quad \text{[Equation 10]}$$

using a band balance coefficient wy and a chromaticity balance coefficient wd. The $n_{11}, \ldots, n_{33}$ have been already known, the calculated values are used as for the Ye, Cbs, Crs. The values of Res, Ges, Bes set a component that is out of the predetermined range to a lower limit or an upper limit of the predetermined range. Then, for example, by setting the band balance coefficient wy=1, the chromaticity balance coefficient wd is calculated from Equation 10. The chromaticity dynamics coefficient may be multiplied by the obtained chromaticity balance coefficient wd to be a new chromaticity dynamics coefficient. For example, when a color characteristic adjustment is performed by Equation 1, the chromaticity dynamics coefficient is αd, and thus, the chromaticity dynamics coefficient αd of Equation 1 may be updated to be set to (wd·αd−wd+1). Meanwhile, in that case, the band balance coefficient wy=1, which means that the band emphasis signal Ys is used as it is, and the band emphasis coefficient is not changed.

Surely, by setting the chromaticity balance coefficient wd=1, a component out of the range is set to a lower limit or an upper limit of the predetermined range, and the band balance coefficient wy may be calculated from Equation 10. For example, when a band emphasis is performed by Equation 5, the band emphasis coefficient is αy, and thus, the band emphasis coefficient αy may be updated to be set to wy·αy. In addition, the band balance coefficient wy and the chromaticity balance coefficient wd are changed to a predetermined relationship, the band balance coefficient wy and the chromaticity balance coefficient wd which satisfy Equation 10 may be obtained to update and set the band emphasis coefficient and the chromaticity dynamics coefficient.

Meanwhile, when the color characteristic adjusting pixel value RsGsBs outputted from the color characteristic adjusting unit 11 and the band emphasis signal Ye are obtained in the coefficient setting unit 16, the coefficient setting unit 16 may perform the above-described calculation to obtain each coefficient that is updated. It is sure that the luminance-chromaticity signal YsCbsCrs is obtained by the conversion in the color conversion unit 12 or the pixel value of the characteristic emphasized image ResGesBes may be obtained by the further conversion in the color reverse conversion unit 15.

Figure 6:
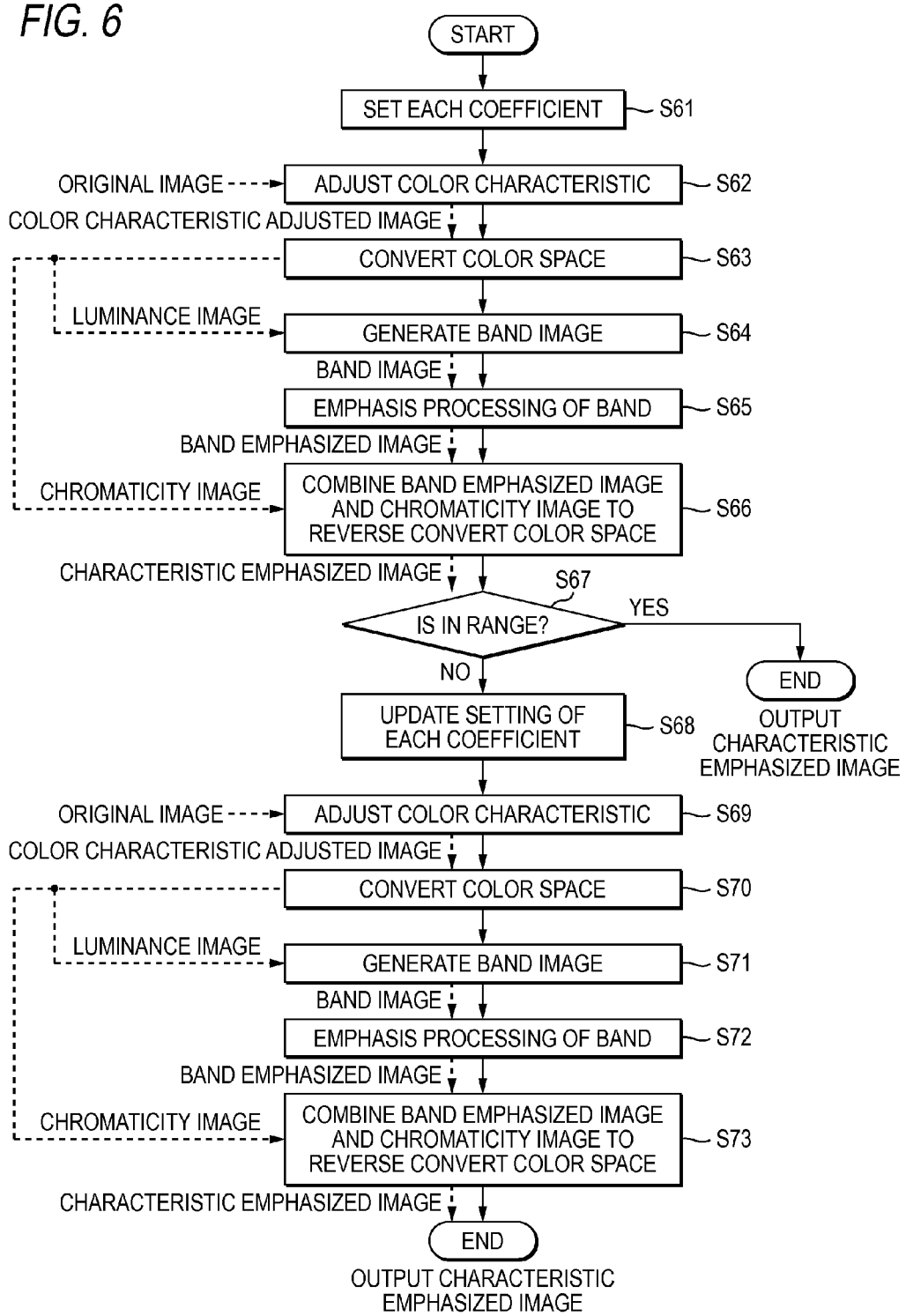
FIG. 6 is a flow chart illustrating an example of an operation procedure in the exemplary embodiment of the present invention.

FIG. 6 is a flow chart illustrating an example of the operation procedure in the exemplary embodiment of the present invention. In this example, a case where each coefficient is updated in the coefficient setting unit 16 will be described.

At S61, the coefficient setting unit 16 performs settings of various coefficients such as, for example, setting of the chromaticity dynamics coefficient in relation to the color characteristic adjusting unit 11, setting of the band emphasis coefficient in relation to the band emphasizing unit 14 or setting of the band selection coefficient in relation to the band image generating unit 13.

At S62, the color characteristic adjusting unit 11 adjusts the color characteristic in relation to the given color original image based on the chromaticity dynamics coefficient set by the coefficient setting unit 16 and obtains the color characteristic adjusted image.

At S63, the color conversion unit 12 performs the color space conversion in relation to the color characteristic adjusted image of which the color characteristic is adjusted, and obtains the luminance-chromaticity image.

At S64, the band image generating unit 13 generates the band image of the frequency band based on the band selection coefficient that is set by the coefficient setting unit 16 or is already set from the luminance image (which is an image represented by the luminance component of the luminance-chromaticity image obtained at S63).

At S65, the band emphasizing unit 14 performs the emphasis processing for the band image generated by the band image generating unit 13 at S64 based on the band emphasis coefficient set by the coefficient setting unit 16, and obtains the band emphasized image.

At S66, the color space conversion is made by using the chromaticity component of the luminance-chromaticity image obtained at S63 and the luminance component of the band emphasized image obtained at S65, and the characteristic emphasized image is obtained.

At S67, it is determined whether the pixel value of the characteristic emphasized image obtained at S66 is within a predetermined range. When it is within the range, the characteristic emphasized image may be outputted.

When it is determined that a value out of the range is present at S67, the coefficient setting unit 16 updates the setting of each coefficient so that the coefficient falls within the range at S68. Here, the settings of the band emphasis coefficient and the chromaticity dynamics coefficient are also updated.

At S69, the color characteristic adjusting unit 11 adjusts the color characteristic in relation to the given color original image based on the chromaticity dynamics coefficient set by the coefficient setting unit 16 at S68, and the color conversion unit 12 converts the color space in relation to the color characteristic adjusted image of which the color characteristic is adjusted and obtains the luminance-chromaticity image at S70.

At S71, the band image generating unit 13 generates the band image of the frequency band based on the band selection coefficient that is set by the coefficient setting unit 16 or is already set from the luminance image (which is an image represented by the luminance component of the luminance-chromaticity image obtained at S70). Further, at S72, the band emphasizing unit 14 performs the emphasis processing for the band image generated by the band image generating unit 13 based on the band emphasis coefficient set by the coefficient setting unit 16 at S68, and obtains the band emphasized image.

At S73, the color space conversion is made by using the chromaticity of the luminance-chromaticity image obtained at S71 and the luminance of the band emphasized image obtained at S72, and the characteristic emphasized image is obtained.

Although the coefficient setting unit 16 updates the band emphasis coefficient and the chromaticity dynamics coefficient at S68 in the operational example, for example, when the band emphasis coefficient is updated without updating the chromaticity dynamics coefficient, the present invention may be configured so that the processing results of S62, S63 and S64 are used without performing the S69, S70 and S71 again. In addition, when the coefficient setting unit 16 does not update the coefficient, the processings of S67 or more may not be performed. Alternatively, it may be configured so that, when the determination at S67 is performed and a value out of the range is present in the pixel value of the characteristic emphasized image, it is an error.

Figure 7:
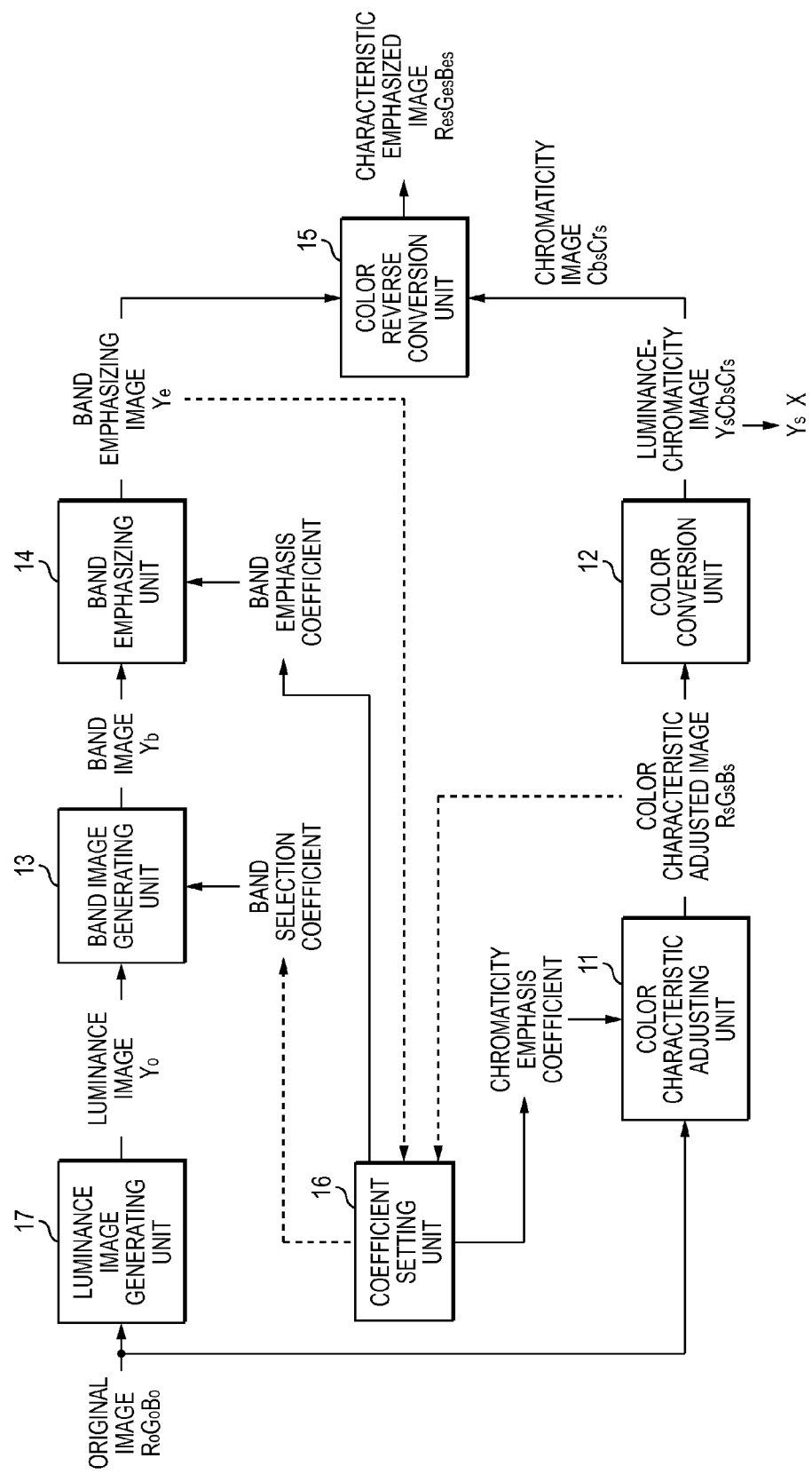
FIG. 7 is a block diagram illustrating a modified example of the exemplary embodiment of the present invention.

FIG. 7 is a block diagram illustrating a modified example of the exemplary embodiment of the present invention. In FIG. 7, reference numeral 17 indicates a luminance image generating unit. Although, in the above-described example, the emphasis of the band is performed after the color characteristic adjustment, in the modified example discloses that the emphasis processing of the band is performed in relation to the given color original image aside from the color characteristic adjustment. Hereinafter, ones which are different from the configuration illustrated in FIG. 1 will be described.

The luminance-chromaticity generating unit 17 generates the luminance image from the given color original image. To obtain the luminance image, the signal of the original image is converted into the luminance-chromaticity signal and then the luminance signal may be extracted therefrom. In the example, since the YCbCr color space is used as for the color space of the luminance-chromaticity, the signal of the RGB color space of the original image is converted into the signal of the YCbCr color space, and then the Y component may be extracted to obtain the luminance image. The conversion may be performed by Equation 2. Meanwhile, the luminance image may be obtained using the L* component when the color space of the luminance-chromaticity is LAB color space, and may be obtained using the V component when it is HSV color space.

The band image generating unit 13 generates a band image that represents the predetermined band from the luminance image generated in the luminance image generating unit 17. Therefore, the band emphasis processing is performed with regard to the luminance image obtained from the given original image. Other processing of the band image generating unit 13 and other configuration are the same as ones as described above.

Figure 8:
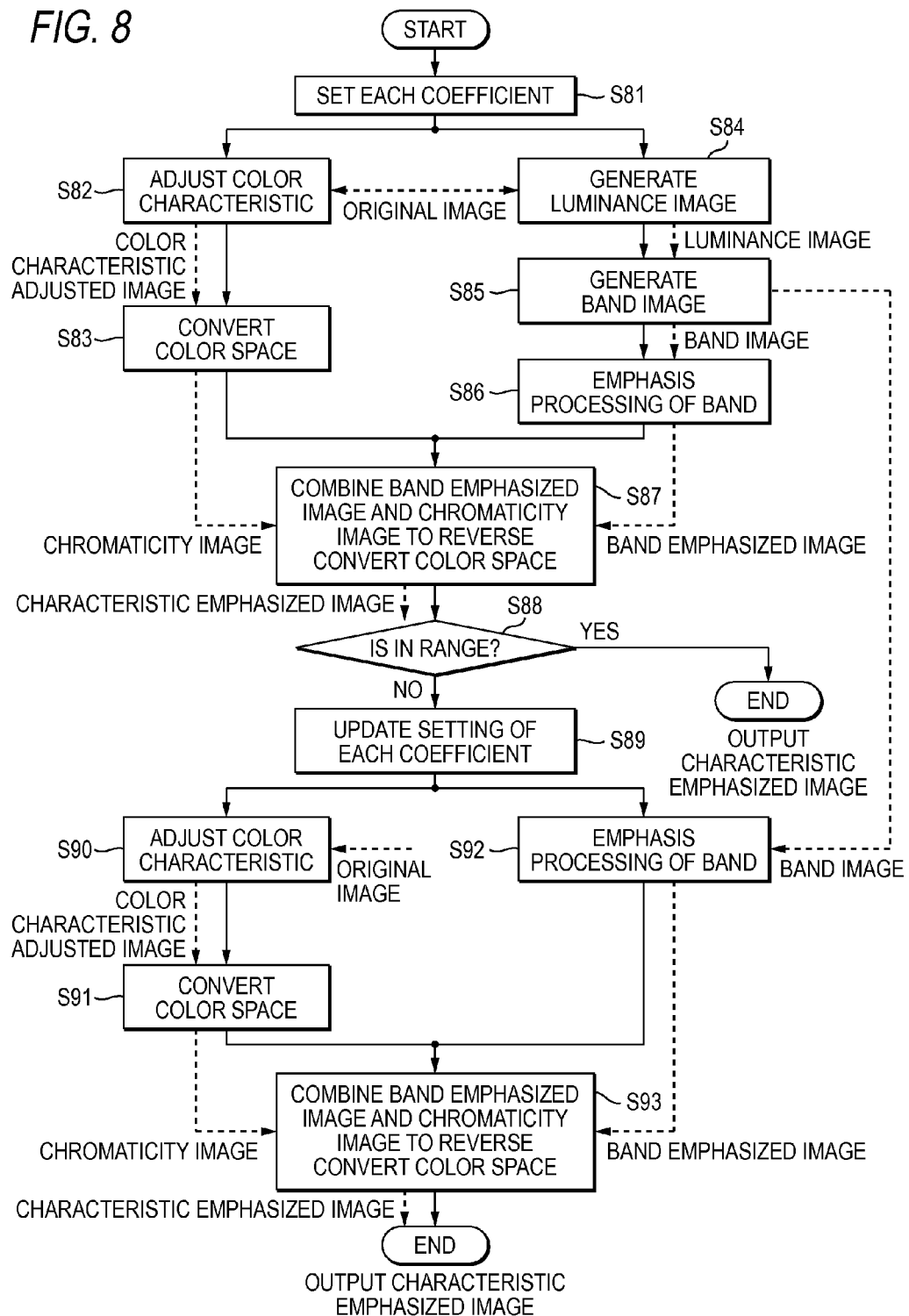
FIG. 8 is a flow chart illustrating an example of an operation procedure in the modified example of the exemplary embodiment of the present invention.

FIG. 8 is a flow chart illustrating an example of the operation procedure in the modified example of the exemplary embodiment of the present invention. In the example, an example of the operation when the color characteristic adjustment processing and the band emphasis processing are performed in parallel is described. Even in this example, each coefficient is updated in the coefficient setting unit 16.

At S81, the coefficient setting unit 16 performs settings of various coefficients such as, for example, setting of the band emphasis coefficient in relation to the band emphasizing unit 14, setting of the chromaticity dynamics coefficient in relation to the color characteristic adjusting unit 11 or setting of the band selection coefficient in relation to the band image generating unit 13.

As a processing of one side, at S82, the color characteristic adjusting unit 11 adjusts the color characteristic in relation to the given color original image based on the chromaticity dynamics coefficient set by the coefficient setting unit 16. In addition, at S83, the color conversion unit 12 performs the color space conversion in relation to the color characteristic adjusted image of which the color characteristic is adjusted, and obtains the luminance-chromaticity image.

As a processing of the other side, at S84, the luminance image generating unit 17 converts the given color original image into a color space of which component is luminance, and generates the luminance image. In addition, at S85, the band image generating unit 13 generates the band image of the frequency band based on the band selection coefficient that is set by the coefficient setting unit 16 or is already given from the luminance image generated at S84. Further, at S86, the band emphasizing unit 14 performs the emphasis processing for the band image generated by the band image generating unit 13 based on the band emphasis coefficient set by the coefficient setting unit 16, and obtains the band emphasized image.

When the both processings are completed, at S87, the color space conversion is made by using the chromaticity of the luminance-chromaticity image obtained at S83 and the luminance of the band emphasized image obtained at S86, and the characteristic emphasized image is obtained.

At S88, it is determined whether the pixel value of the characteristic emphasized image obtained at S87 is within a predetermined range. When it is within the range, the characteristic emphasized image may be outputted.

When it is determined that a value out of the range is present at S88, the coefficient setting unit 16 updates the setting of each coefficient so that the coefficient falls within the range at S89. Here, the settings of the band emphasis coefficient and the chromaticity dynamics coefficient are also updated.

The color characteristic adjustment and the band emphasis processing are performed in parallel using each updated coefficient. As a processing of one side, at S90, the color characteristic adjusting unit 11 adjusts the color characteristic in relation to the given color original image based on the chromaticity dynamics coefficient set by the coefficient setting unit 16 at S89, and the color conversion unit 12 converts the color space in relation to the color characteristic adjusted image of which the color characteristic is adjusted and obtains the luminance-chromaticity image at S91.

As a processing of the other side, at S92, the band emphasizing unit 14 performs the emphasis processing for the band image generated by the band image generating unit 13 based on the band emphasis coefficient updated by the coefficient setting unit 16 at S89, and obtains the band emphasized image.

When the both processings are completed, at S93, the color space conversion is made by using the chromaticity of the luminance-chromaticity image obtained at S91 and the luminance of the band emphasized image obtained at S92, and the characteristic emphasized image is obtained.

Even in the operational example, when the coefficient setting unit 16 does not update the coefficient, the processings of S88 or more may not be performed. Alternatively, it may be configured so that, when the determination at S88 is performed and a value out of the range is present in the pixel value of the characteristic emphasized image, it is an error. Surely, in the modified example, the color characteristic adjustment and the band emphasis processing may be sequentially performed as in the operational example illustrated in FIG. 6, and in such a case, the emphasis processing of the band may be performed after the color characteristic adjustment or the color characteristic adjustment may be performed after the band emphasis processing. In that case, the luminance image generating unit 17 generates a luminance image when the band image is generated, and the band image is generated using the generated luminance image.

Figure 9:
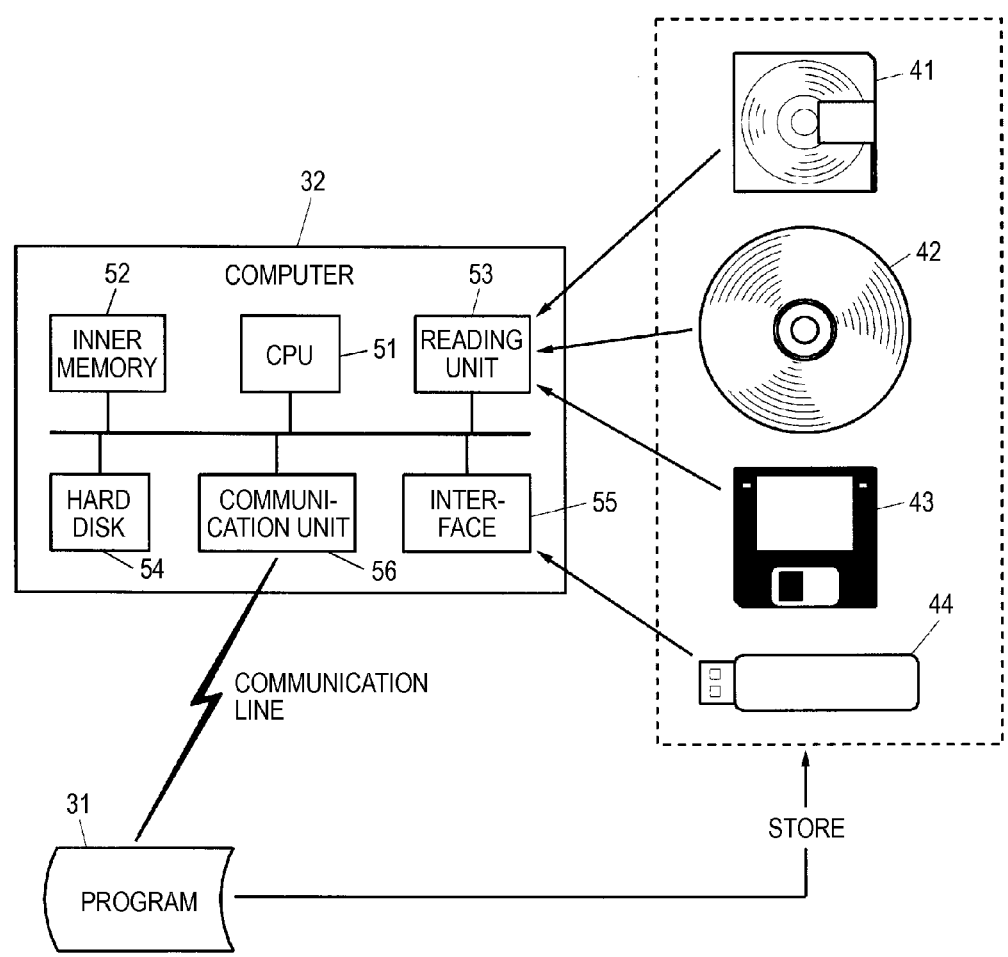
FIG. 9 is an explanatory view illustrating a computer program, a storage medium that stores the program, and a computer in a case where the functions described in the exemplary embodiment of the present invention and the modified example thereof are implemented by the computer program.

FIG. 9 is an explanatory view illustrating a computer program, a storage medium that stores the program, and a computer in a case where the functions described in the exemplary embodiment of the present invention and the modified example thereof are implemented by the computer program. In FIG. 9, reference numeral 31 indicates a program, reference numeral 32 indicates a computer, reference numeral 41 indicates an opto-magnetic disc, reference numeral 42 indicates an optical disc, reference numeral 43 indicates a magnetic disc, reference numeral 44 indicates a memory, reference numeral 51 indicates a CPU, reference numeral 52 indicates an inner memory, reference numeral 53 indicates a reading unit, reference numeral 54 indicates a hard disk, reference numeral 55 indicates an interface, and reference numeral 56 indicates a communication unit.

The function of each of the units described in the exemplary embodiment of the present invention and the modified example thereof as described above may be realized by the program 31 executed by the computer as a whole or a portion thereof. At that case, for example, the program 31 and data used in the program may be stored in a storage medium to be read by the computer. The storage medium causes the status of energy such as magnetism, light, and electricity to be changed based on the description of the program in relation to the reading unit 53 included in the hardware source of the computer, and transfers the description of the program to the reading unit 53 in a form of a signal corresponding to the status change. For example, the storage medium includes the opto-magnetic disc 41, the optic disc 42 (including, e.g., a CD or a DVD), the magnetic disc 43, and the memory 44 (including, e.g., an IC card, a memory card, and a flash memory). Surely, these storage media are not limited to a portable type.

The program 31 is stored in these storage media, these storage media are mounted in, for example, the reading unit 53 or the interface 55 of the computer 32, the program 31 is read from the computer to be stored in the inner memory 52 or the hard disc 54 (including, for example, the magnetic disc or a silicon disc), and the program 31 is executed by the CPU 51, such that the function of the exemplary embodiment of the invention and the modified example thereof as described above are realized as a whole or a part. Alternatively, the function of the exemplary embodiment may be implemented in such a manner that the program 31 may be transferred to the computer 32 via a communication line, and in the computer 32, the communication unit 56 may receive the program 31 to store it in the inner memory 52 or the hard disc 54, and the program 31 may be executed by the CPU 51, The computer 32 may be connected with various devices via the interface 55. For example, a display unit that displays information is connected to the computer and the original image or the characteristic emphasized image may be displayed. Further, a receiving unit that receives information from a user is connected to the computer, and an instruction or a selection of the setting may be performed in relation to the coefficient setting unit 16. Surely, other devices may be connected to the computer. Meanwhile, each configuration may not be operated by a single computer, a separate computer may perform the processing according to the process steps.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   at least one processor configured to execute:
      an adjusting unit configured to adjust a color characteristic of a color image;
      a conversion unit configured to convert the color image of which the color characteristic is adjusted with the adjusting unit into a luminance-chromaticity image;
      a band image generating unit configured to generate a band image that represents a given band from a luminance image of the luminance-chromaticity image;
      an emphasizing unit configured to obtain a band emphasized image that emphasizes a band using the luminance image and the band image; and
      a setting unit configured to set an emphasized degree of the band performed by using the emphasizing unit and an adjusted degree of the color characteristic performed by using the adjusting unit.

2. The image processing apparatus of claim 1, wherein the setting unit is configured to set the adjusted degree of the color characteristic and the emphasized degree of the band to be performed by using the emphasizing unit based on the scene of the color image.

3. The image processing apparatus of claim 1, wherein the setting unit is configured to set the adjusted degree of the color characteristic and the emphasized degree of the band to be performed by using the emphasizing unit so that a pixel value of the luminance-chromaticity image falls within a color gamut.

4. The image processing apparatus of claim 1, wherein the setting unit is configured to set the adjusted degree of the color characteristic and the emphasized degree of the band to be performed by using the emphasizing unit using the color image of which the color characteristic is adjusted by the adjusting unit.

5. The image processing apparatus of claim 1, wherein the setting unit is also configured to set a band when the band image generating unit generates the band image.

6. The image processing apparatus of claim 1, wherein the adjusting unit is configured to adjust the color characteristic according to a set chromaticity dynamics coefficient, and
   wherein the setting unit is configured to set the chromaticity dynamics coefficient used by the adjusting unit.

7. An image processing apparatus comprising:
   at least one processor configured to execute:
      a luminance image generating unit configured to generate a luminance image from a color image;
      a band image generating unit configured to generate a band image that represents a given band from the luminance image;
      an emphasizing unit configured to obtain a band emphasized image that emphasizes a band using the luminance image and the band image;
      an adjusting unit configured to adjust a color characteristic of the color image;
      a conversion unit configured to convert the color image of which the color characteristic is adjusted with the adjusting unit into a luminance-chromaticity image; and
      a setting unit configured to set an emphasized degree of the band performed by using the emphasizing unit and an adjusted degree of the color characteristic performed by using the adjusting unit.

8. An image processing method comprising:
   adjusting, by at least one processor, a color characteristic of a color image;

converting, by the at least one processor, the color image of which the color characteristic is adjusted into a luminance-chromaticity image;

generating, by the at least one processor, a band image that represents a given band from a luminance image of the luminance-chromaticity image;

obtaining, by the at least one processor, a band emphasized image that emphasizes a band using the luminance image and the band image; and setting, by the at least one processor, an emphasized degree of the band and an adjusted degree of the color characteristic.

9. A non-transitory computer readable medium storing a program causing a computer to execute a process for an image processing, the process comprising:

adjusting a color characteristic of a color image;

converting the color image of which the color characteristic is adjusted into a luminance-chromaticity image;

generating a band image that represents a given band from a luminance image of the luminance-chromaticity image;

obtaining a band emphasized image that emphasizes a band using the luminance image and the band image; and setting an emphasized degree of the band and an adjusted degree of the color characteristic.

* * * * *